United States Patent [19]
Reichmann et al.

[11] Patent Number: 5,886,517
[45] Date of Patent: Mar. 23, 1999

[54] DISPLACEMENT PICK-UP FOR DETECTING OF ACTUATOR WITH TWO INDEXING WHEELS

[76] Inventors: Siegfried Reichmann, Werdenbeg 12, 42925 Wermelskirchen; Wolfgang Moench, Ooser Burstrasse, 76532 Baden-Baden, both of Germany

[21] Appl. No.: 740,364

[22] Filed: Oct. 28, 1996

[51] Int. Cl.⁶ .............................. G01B 7/30; G01B 7/14; G01D 5/00; B60J 7/057

[52] U.S. Cl. ...................... 324/207.2; 296/223; 318/653; 318/466; 324/207.22; 324/207.24; 324/207.25

[58] Field of Search ........................... 324/207.2–207.25; 296/223; 318/653, 466, 467

[56] References Cited

U.S. PATENT DOCUMENTS

| | | | |
|---|---|---|---|
| 5,211,063 | 5/1993 | Hobmaier et al. ............. | 324/207.23 X |
| 5,481,188 | 1/1996 | Mizutani ............................. | 324/207.25 |
| 5,646,523 | 7/1997 | Kaiser et al. ........................ | 324/207.2 |

*Primary Examiner*—Gerard R. Strecker

[57] ABSTRACT

In a displacement pick-up for detecting the displacement of an actuator driven by a rotating drive element, which has an indexing mechanism (11) with a first indexing wheel (13), driven by the drive element and having an indexing cam (19), and a rotatable second indexing wheel with encompassing teeth (20), and which also has a device (12) for detecting the rotary position of the second indexing wheel (15), for the sake of achieving high freedom from noise the teeth (20) on the second indexing wheel (15) and the indexing cam (19) meshing with them on the first indexing wheel (13) are embodied with large surface areas, and the two indexing wheels (13, 15) are magnetized in such a way that their respective immediately adjacent faces repel one another.

10 Claims, 2 Drawing Sheets

DISPLACEMENT PICK-UP FOR DETECTING OF ACTUATOR WITH TWO INDEXING WHEELS

BACKGROUND OF THE INVENTION

The invention relates to a displacement pick-up for detecting the displacement of an actuator driven by a rotating drive element, in particular a transmission output pinion, particularly for a sliding roof in motor vehicles, of the generic type.

Such displacement pick-ups are used in the control and detection of position of drive units, in order to detect the displacement of the actuators, driven by the drive units, inside the drive units. With the integrated indexing mechanism, high positioning accuracy is attainable. In a conventional indexing mechanism, when the indexing cam disposed on the first indexing wheel strikes the tooth flanks of the teeth of the second indexing wheel, in order to slave it rotationally in increments, the result is clearly-audible clicking sounds, which if the indexing sequence is rapid cause considerable noise. Because of this noise, some kinds of applications in which extensive noiselessness is demanded are closed to such displacement pick-ups.

SUMMARY OF THE INVENTION

The displacement pick-up of the invention has the advantage over the prior art that the integrated indexing mechanism functions absolutely silently. Because of the magnetization of the indexing wheels with a repellent resultant magnetic force between them, an air gap always remains between the meshing surfaces of the indexing cam and the teeth and prevents the meshing surfaces from striking one another. The second indexing wheel is driven silently forward by the indexing cam of the first indexing wheel because of the repellent magnetic force, until after an indexing step the indexing cam re-emerges from the teeth of the second indexing wheel. This is always the case as long as the load moment on the second indexing wheel is not significantly greater than the rated torque. If the second indexing wheel moves with considerable sluggishness, for instance because of bearing damage, soiling or icing up and the magnetic force no longer suffices to rotate the second indexing wheel, then after overcoming the air gap the indexing cam strikes the tooth flanks of the teeth. This naturally creates the known impact noise. However, this noise is acceptable for temporary emergency operation. The displacement pick-up of the invention thus has the additional advantage of enabling emergency operation for adjusting the actuator even if the indexing wheel is sluggish.

Advantageous further features of and improvements to the displacement pick-up are possible with the provisions recited in the other claims.

In an advantageous embodiment of the invention, the two indexing wheels are magnetized axially or radially with the same direction of magnetization; radial magnetization with the magnetic north or south pole in the center of the wheel has proved to be more effective. The indexing wheels are preferably embodied as injection molded parts of plastoferrite or as a sandwich between plastoferrite and plastic. Alternatively, however, annular magnets in combination with baffles may be provided in the indexing wheels. The geometrical shape of the baffles will then be chosen in accordance with the outer teeth or outer contours of the indexing cam.

In a preferred embodiment of the invention, the teeth of the second indexing wheel are subdivided into two identically embodied sets of outer teeth disposed axially immediately one after the other on the circumference of the second indexing wheel. Each set of outer teeth has preferably pointed tooth heads offset by the same circumferential angle from one another, which are joined to one another by arc-shaped tooth flanks that merge smoothly with one another. The two sets of outer teeth are disposed in a fixed relationship to one another, rotated from one another by half the tooth pitch.

In accordance with this embodiment of the second indexing wheel, the first indexing wheel has a circular radial flange, which meshes exclusively with the one set of outer teeth on the second indexing wheel, and whose circumferential surface is opposite, with a radial air gap spacing, the tooth flanks of these outer teeth. The radial flange bulges inward, radially symmetrically, in the region of the indexing cam. The indexing cam has an axially protruding first cam part on the first indexing wheel, for meshing exclusively with the other set of outer teeth on the second indexing wheel, having a hemispherical outer contour and a second cam part, formed by the boundary faces of the inward bulge of the flange. The two cam parts are disposed relative to one another in such a way that upon revolution of the first indexing wheel, they each successively come to mesh with the associated outer teeth and in the process the second cam part rotates into the one set of outer teeth when the first cam part emerges from the other set of outer teeth.

As a result of this structural embodiment, both indexing the second indexing wheel and the ensuing blocking of the second indexing wheel until the next indexing step is accomplished without contact between the outer faces of the first and second indexing wheel, which faces rotate directly past one another and face one another across the air gap. While the first indexing cam, by meshing with the one set of outer teeth, initiates the indexing step of the second indexing wheel, and this step is then terminated by the meshing of the second cam part with the other set of outer teeth, blocking of the second indexing wheel is accomplished, by swiveling the arc-shaped radial flange into the tooth flank region between two successive tooth heads of the outer teeth, until such time as the radial flange, with simultaneous rotating of the first cam part of the indexing cam into its associated outer teeth, emerges from the outer teeth.

In a preferred embodiment of the invention, the device for detecting the rotary position of the second indexing wheel is a magnetic sensor unit that detects changes in the magnetic field of the rotating indexing wheels. Thus the detection of the rotary position of the second indexing wheel is likewise accomplished in contactless and noiseless fashion.

In an advantageous embodiment of the invention, the sensor unit has at least two Hall sensors or Hall switches, disposed in the magnetic field of the second indexing wheel and spaced apart by a rotary angle from one another and, on the second indexing wheel, has a magnetic discontinuity which upon approximate alignment with a respective one of the Hall sensors or Hall switches causes a change in the output signal of that sensor or switch. The output signals of the two Hall sensors are evaluated. A stop signal is generated as soon as a Hall sensor changes its output signal, which occurs whenever the magnetic discontinuity is approximately aligned with the Hall sensor. The disposition of the two Hall sensors relative to one another produces the number of adjusting increments of the second indexing wheel and thus the displacement of the actuator. In the case of an indexing cam on the first indexing wheel, further transport of the second indexing wheel by one indexing step requires the revolution of the first indexing wheel by 360° each time. Hence the resolution of the displacement is 360°.

Improved resolution of the displacement, of only 180°, is attained in a further embodiment of the invention in that the sensor unit additionally has still another Hall sensor or Hall switch, disposed in the magnetic field of the first indexing wheel, and a magnetic discontinuity disposed on the first indexing wheel in the region of the indexing cam, which discontinuity, upon approximate alignment with the further Hall sensor, causes a change in the output signal of the further sensor. If the output signals of the Hall sensor associated with the first indexing wheel and a respective one of the Hall sensors associated with the second indexing wheel are logically linked in "AND" fashion, then a stop signal for stopping the drive element is output only whenever the defined discontinuity on the second indexing wheel is oriented with one of the two Hall sensors, and the limited discontinuity of the first indexing wheel is oriented with the further Hall sensor.

In a preferred embodiment of the invention, the three-dimensionally defined magnetic discontinuities on the indexing wheels are embodied by means of segmental protuberances or indentations provided there. Upon axial magnetization of the indexing wheels, the segmental protuberances are preferably each embodied as an integral prism of circular-segmental cross section, axially protruding from the respective indexing wheel and spaced apart radially from its pivot axis, and the Hall sensors are disposed on a printed circuit board and are axially spaced apart from the associated indexing wheel. If each prism is located under a Hall sensor, then the resultant change in magnetic field causes a change in the output signal of the associated Hall sensor. The prisms are embodied such that each prism on the second indexing wheel extends over nearly one tooth pitch of the outer teeth meshing with the radial flange of the first indexing wheel, and the prism on the first indexing wheel extends over somewhat more than the inward bulge of the radial flange. The maximum radial spacing of the semicircular outer contour of the first cam part of the indexing cam from the pivot axis of the first indexing wheel, and the outer radius of the arc-shaped flange, are of equal length.

BRIEF DESCRIPTION OF THE DRAWING

The invention is described in further detail in the ensuing description, in terms of an exemplary embodiment shown in the drawing. Shown are.

DESCRIPTION OF THE EXEMPLARY EMBODIMENT

Figure 1:
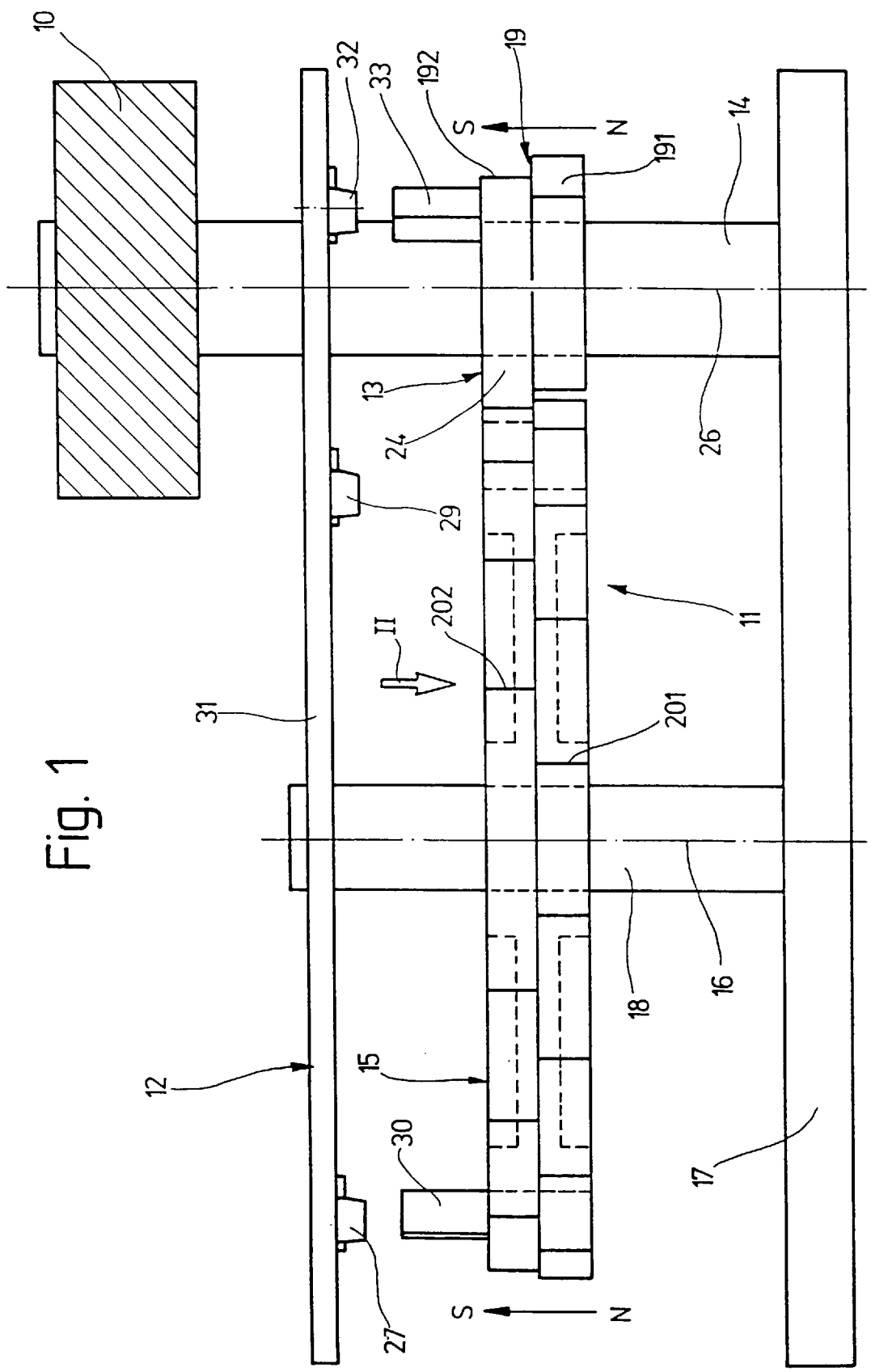
FIG. 1, a side view of a displacement pick-up for a sliding roof of a motor vehicle.

The displacement pick-up, seen in side view in FIG. 1, serves to detect the current position of a sliding roof in a motor vehicle, which is opened, closed, raised or lowered by an electric drive unit. Since the position of the sliding roof cannot be picked up directly at the sliding roof, the position detection by the displacement pick-up takes place in the drive unit. The drive unit, in a known manner, comprises an electric motor and a step-up gear, whose output pinion effects the motion of the sliding roof directly. All that is shown of the drive unit in FIG. 1 is the output pinion 10.

The displacement pick-up has an indexing mechanism 11 and a device for detecting the rotary position of the indexing mechanism 11, hereinafter called the rotary position detection device 12. The indexing mechanism 11 includes a first indexing wheel 13, which is seated in a manner fixed against relative rotation on a shaft 14 of the output pinion 10, and a second indexing wheel 15, which is disposed to rotate about a pivot axis 16 parallel to the shaft 14; for that purpose, it is seated rotatably on a shaft 18 held in a seat 17. The first indexing wheel 13 has an indexing cam 19, and the second indexing wheel 15 has an encompassing set of teeth 20, with which the indexing cam 19 temporarily meshes upon each revolution of the first indexing wheel 13 and thereby rotates the second indexing wheel 15 onward by one indexing step with a fixed rotary angle. Both indexing wheels 13, 15 are magnetized axially, specifically with the same direction of magnetization. The direction of magnetization of the two indexing wheels is represented as N-S in FIG. 1. The two indexing wheels 13, 15 are each produced as an injection molded part of plastoferrite.

Figure 2:
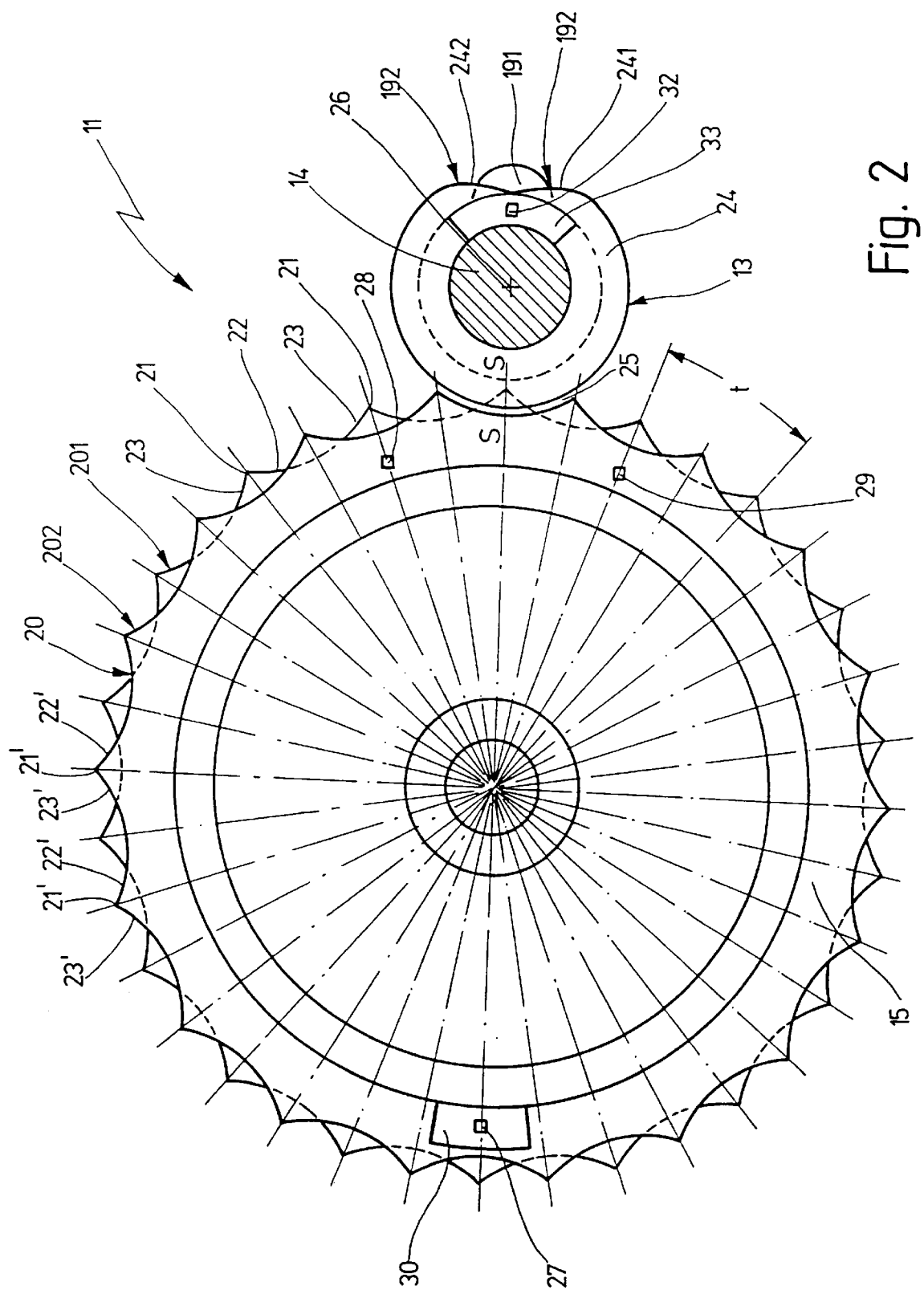
FIG. 2, a plan view of an indexing mechanism, integrated into the displacement pick-up of FIG. 1, seen in the direction of the arrow II of FIG. 1.

In detail, the teeth 20 of the second indexing wheel 15 are subdivided into two identically embodied sets of outer teeth 201, 202, disposed axially immediately one after the other on the circumference of the second indexing wheel 15. Each set of outer teeth 201 or 202 has many pointed tooth heads 21, offset by the same circumferential angle from one another, which are joined to one another by arc-shaped tooth flanks 22, 23, that each extend symmetrically to the tooth head 21. The tooth flanks 22, 23 of successive teeth merge smoothly with one another, so that an arc-shaped surface composed of two tooth flanks 22, 23 extends from one tooth head 21 to the next tooth head 21. The two sets of outer teeth 201 and 202 are disposed in a fixed relationship to one another, offset from one another by half the tooth pitch. In order to clearly show the tooth offset, the reference numerals of the tooth heads 21' and tooth flanks 22', 23' of the outer teeth 202 have been provided with a prime. The tooth pitch is defined by the spacing of the tooth heads 21 and 21' from one another and is indicated as a rotary angle. The tooth pitch, shown as t in FIG. 2, is constant for both sets of outer teeth 201, 202.

The first indexing wheel 13 has a circular radial flange 24, which meshes exclusively with the one set of outer teeth 202. Its outer face, as can be seen from FIG. 2, is opposite the tooth flanks 22', 23' of the outer teeth 202, leaving a radial air gap 25. The radial flange 24 of the indexing cam 19 bulges radially symmetrically inward in such a way that its flange radius decreases steadily to a minimum. The indexing cam 19 has a radially protruding first cam part 191 on the first indexing wheel 13, for meshing exclusively with the set of outer teeth 201 on the second indexing wheel 15, and a second cam part 192, formed by the boundary faces 241, 242 of the inward bulge of the flange. The first cam part 191 has an approximately hemispherical contour whose maximum spacing from the pivot axis 26 of the first indexing wheel 13 is equal to the outer diameter of the radial flange 24. The two cam parts 191, 192 are disposed on the first indexing wheel 13 relative to one another such that upon revolution of the first indexing wheel 13, they come into engagement in succession respectively with the associated set of outer teeth 201 or 202 on the second indexing wheel 15, spaced apart by an air gap from the tooth flanks 22, 23 and 22', 23', respectively, and in the process the second cam part 192 rotates into the one set of outer teeth 202 when the first cam part 191 emerges from the other set of outer teeth 201.

The mode of operation of the indexing mechanism 11 is as follows:

When the first indexing wheel 13 is stopped, the radial flange 24 meshes with the associated outer teeth 202; because of the identical axial magnetization direction of the two indexing wheels 13, 15, a resultant magnetic force appears between the two indexing wheels 13, 15, causing the two indexing wheels 13, 15 to be repelled by each other. The air gap 25 is retained as a result, and touching of the tooth faces 22', 23' by the outer surface of the radial flange 24 is prevented. Via the air gap 25 and the tooth flanks 22', 23', the second indexing wheel 15 is blocked from rotating by the radial flange 24 when the first indexing wheel 13 is at a stop. If the drive unit is then switched on and the drive pinion 10 displaces the sliding roof, then upon each revolution of the first indexing wheel 13, for instance counter clockwise in FIG. 2, the first cam part 191 first meshes with the outer teeth 201 associated with it, and across the air gap 25 produced by the resulting repellent magnetic force between the outer contour of the first cam part 191 and the tooth flank 23, it indexes the second indexing wheel 15, initially by a one-half indexing step, which corresponds to the one-half tooth pitch of the outer teeth 201. The first cam part 191 now emerges from the outer teeth 201, and at the same time the second cam part 192 enters into engagement with its associated outer teeth 202. Because of the resultant repellent magnetic force between the two indexing wheels 13, 15, an air gap 25 again remains between the boundary face 241 of the inward bulge of the flange and the tooth flank 23' of the outer tooth 202, and as a result the second cam part 192 does not touch the tooth flank 23', either. The second cam part 192 thus contactlessly rotates the second indexing wheel 15 by a further one-half indexing step, until the second cam part 192 again emerges from the outer teeth 202. The second indexing wheel 15 is thus rotated onward by one indexing step, which corresponds to a fixed rotary angle and is equal to the tooth pitch t of the outer teeth 201, 202. The process described is repeated upon the next revolution of the first indexing wheel 13.

As can be seen from this, the second indexing wheel 15 is incrementally rotated mechanically by the first indexing wheel 13, but because of the large-area embodiment of the indexing cam 19 and teeth 20, and because of the same magnetization of the two indexing wheels 13, 15, the meshing surfaces of the indexing cam 19 and teeth 20 that cause the mechanical indexing onward of the second indexing wheel 15 do not touch one another. This is always true as long as no load movement that is significantly greater than the rated torque appears at the second indexing wheel 15. However, if the second indexing wheel becomes extremely sluggish, for instance from icing up, bearing damage or soiling of the bearing, then the resultant magnetic force between the indexing wheels 13, 15 is no longer sufficient to preserve the air gap 25 between the indexing cam 19 and the teeth 20. In that case, the indexing cam 19 strikes the corresponding tooth flanks 23 and 23' of the outer teeth 201 and 202, and the second indexing wheel 15 is rotated violently onward by surface contact between the indexing cam 19 and the teeth 20.

In the case of the reverse direction of rotation of the electric motor of the drive unit, the shaft 14 and thus the first indexing wheel 13 rotates clockwise in terms of FIG. 2. The indexing operation for slaving of the second indexing wheel 15 is the same as described above, except that the indexing cam 19 now, via the tooth flanks 22 and 22', moves the second indexing wheel 15 onward counterclockwise by one indexing step upon each revolution.

Because of the existing magnetization of the indexing wheels 13, 15, the rotary position detection device 12 is advantageously embodied as a magnetic sensor unit, which detects changes in the magnetic field of the rotating indexing wheels 13, 15 and thus detects the rotary position of the second indexing wheel 15. The second unit has three Hall sensors or Hall switches 27, 28, 29, disposed in the magnetic field of the second indexing wheel 15, and a magnetic discontinuity, disposed on the second indexing wheel 15, which in the exemplary embodiment of FIGS. 1 and 2 is embodied as a prism 30 of circular-segmental cross section that protrudes from the second indexing wheel 15, radially spaced apart from the pivot axis 16 thereof. However, the magnetic discontinuity may also be embodied by some other kind of protuberance or even by an indentation in the second indexing wheel 15. The Hall sensors 27–29 are disposed on a printed circuit board 31, which is disposed in three-dimensionally fixed fashion, spaced apart from the indexing wheels 13, 15. The Hall sensors 27–29 are disposed on the underside of the printed circuit board 31, oriented toward the second indexing wheel 15. In FIG. 1, only the Hall sensors 27 and 29 can be seen. To illustrate the location of the three Hall sensors 27–29 on the printed circuit board 30, the Hall sensors 27–29 are additionally shown in FIG. 2, where they must be imagined as being axially spaced apart from the second indexing wheel 15.

The mode of operation of the Hall sensors 27–29 is known and is described for instance in U.S. Pat. No. 4,857,784. In brief, each Hall sensor 27–29 changes its electrical output signal if the magnetic field to which it is exposed varies. The variation of the magnetic field is effected by the prism 30, if the prism is approximately axially aligned with one of the Hall sensors 27–29, as is shown in FIG. 1 for the case of the Hall sensor 27. An electronic circuit, not shown here, evaluates the output signals of the Hall sensors 27–29 and stops the electric motor of the drive unit as soon as the prism 30 is located below one of the Hall sensors 2729. The disposition of the Hall sensors 27–29 relative to one another in terms of their distribution over the second indexing wheel 15 produces the number of indexing steps of the second indexing wheel 15 and thus the displacement of the sliding roof by the drive pinion 10. As can be seen from FIG. 2, the second indexing wheel 15 is rotated by eight indexing steps, for instance, before the output signal of the Hall sensor 28 causes the electric motor to stop.

Since the first indexing wheel 13 must turn one full revolution, so that the second indexing wheel 15 will be rotated onward by one indexing step, the resolution over the displacement is 360°. To attain better resolution over the displacement, in this case of 180°, the magnetic sensor unit has a fourth Hall sensor 32, disposed on the printed circuit board 31 and associated with the first indexing wheel 13, and a magnetic discontinuity, provided on the first indexing wheel 13 in the region of the indexing cam 19. Once again, this discontinuity is embodied by a prism 33, which has a circular-segmental cross section and protrudes axially and integrally from the first indexing wheel 13 and is radially spaced apart from the pivot axis 26 of the first indexing wheel 13. The prism 33 extends over somewhat more than the inward bulge, on the first indexing wheel 13, of the radial flange 24 with its boundary faces 241 and 242, while the prism 30 that axially protrudes integrally from the second indexing wheel 15 extends over somewhat less than one tooth pitch of the outer teeth 202. The two prisms 30, 33 are radially symmetrically arranged. The Hall sensor 32 likewise changes its output signal as soon as the prism 33 is located axially below it, as shown in FIG. 1. The electronic circuit now links the output signal of the Hall sensor 32 to the respective output signal of the Hall sensors 27, 28 or 29 by means of a logical "AND" element, so that the electric motor of the drive unit is not stopped until both the Hall sensor 27 or the Hall sensor 28 or the Hall sensor 29 and the Hall sensor 32 changes its output signal, or in other words until the prism 33 is below the Hall sensor 32 and the prism 30 is below one of the Hall sensors 27, 28 or 29. The number of Hall sensors 27–29 associated with the second indexing wheel 15 and their distribution over the circumference of the second indexing wheel 15 is arbitrary and depends on the displacement of the sliding roof to be achieved.

The invention is not limited to the described exemplary embodiment of a displacement pick-up for a sliding roof in motor vehicles. For instance, the displacement pick-up can be used to detect the displacement of an arbitrary actuator. It is understood also to be possible not to use a magnet sensor unit as the rotary position detection device, but rather to use a counting mechanism, for instance, that is connected to the second indexing wheel in a manner fixed against relative rotation. However, the magnetic sensor unit has the advantage of the likewise contactless and hence noiseless detection of the rotary angle of the second indexing wheel.

We claim:

1. A displacement pick-up for detecting the displacement of an actuator driven by a rotating drive element, having an indexing mechanism (11), which has a first indexing wheel (13), connected to the drive element in a manner fixed against relative rotation for driving the indexing mechanism, with at least one indexing cam (19) disposed on the indexing wheel, and a second indexing wheel (15), rotatable about a pivot axis (16) that is axially parallel to the drive element, the second indexing wheel carrying an encompassing set of teeth (20) that cooperates with the at least one indexing cam (19), and upon every revolution of the first indexing wheel (13) is rotated onward by at least one indexing step, in each case with a fixed rotary angle, by means of temporary engagement of the indexing cam (19) with the teeth (20), and having a device (12) which senses the second indexing wheel for detecting the rotary position of the second indexing wheel (15), characterized in that the teeth (20) and the indexing cam (19) meshing with them are embodied with large surface areas, and that the two indexing wheels (13, 15) are magnetized such that the respective immediately adjacent faces of the two indexing wheels (13, 15) repel one another.

2. The displacement pick-up of claim 1, characterized in that the two indexing wheels (13, 15) are magnetized axially or radially with the same direction of magnetization.

3. The displacement pick-up of claim 1, characterized in that the indexing wheels (13, 15) are embodied as injection molded parts of plastoferrite or as a sandwich between plastoferrite and plastic.

4. The displacement pick-up of claim 1, characterized in that the teeth (20) of the second indexing wheel (15) are subdivided into two identically embodied sets of outer teeth (201, 202) disposed axially immediately one after the other on the circumference of the second indexing wheel (15); that each set of outer teeth (201, 202) has preferably pointed tooth heads (21, 21') offset by the same circumferential angle from one another, which are joined to one another by arc-shaped tooth flanks (22, 23, 22', 23') that merge smoothly with one another; and that the two sets of outer teeth (201, 202) are disposed in a fixed relationship to one another, rotated from one another by half the tooth pitch (t).

5. The displacement pick-up of claim 4, characterized in that the first indexing wheel (13) has a circular radial flange (24), which meshes exclusively with the one set of outer teeth (202) on the second indexing wheel (15), and whose circumferential surface is opposite and spaced apart by a radial air gap from the tooth flanks (22', 23') of these outer teeth (202); that the radial flange (24), in the region of the indexing cam (19), bulges radially symmetrically inward in such a way that its flange radius decreases steadily to a minimum; that the indexing cam (19) has a radially protruding first cam part (191) on the first indexing wheel (13), for meshing exclusively with the other set of outer teeth (201) on the second indexing wheel (15), with a hemispherical outer contour whose maximum radial spacing from the pivot axis (26) of the first indexing wheel (13) is equal to the outer diameter of the radial flange (24), and also has a second cam part (192), formed by the boundary faces (241, 242) of the inward bulge of the flange; and that the two cam parts (191, 192) of the indexing cam (19) are disposed relative to one another such that upon revolution of the first indexing wheel (13), they come into engagement in succession respectively with the associated set of outer teeth (201 or 202) on the second indexing wheel (15), with air gap spacing from the tooth flanks (22, 23 and 22', 23', respectively), and in the process the second cam part (192) rotates into the one set of outer teeth (202) when the first cam part (191) emerges from the other set of outer teeth (201).

6. The displacement pick-up of claim 1, characterized in that the device (12) for detecting the rotary position of the second indexing wheel (15) is a magnetic sensor unit that detects changes in the magnetic field of the rotating indexing wheels (13, 15).

7. The displacement pick-up of claim 6, characterized in that the sensor unit has at least two Hall sensors (27–29), disposed in the magnetic field of the second indexing wheel (15) and spaced apart by a rotary angle from one another and, on the second indexing wheel (15), has a magnetic discontinuity which upon approximate alignment with a respective one of the Hall sensors (27–29) causes a change in the output signal of that sensor.

8. The displacement pick-up of claim 7, characterized in that the sensor unit has a further Hall sensor (32), disposed in the magnetic field of the first indexing wheel (13), and a magnetic discontinuity disposed on the first indexing wheel (13) in the region of the indexing cam (19), which discontinuity, upon approximate alignment with the further Hall sensor (32), causes a change in the output signal of that sensor; and that the output signals of the Hall sensor (32) associated with the first indexing wheel (13) and a respective one of the Hall sensors (27–29) associated with the second indexing wheel (15) are logically linked in "AND" fashion.

9. The displacement pick-up of claim 7, characterized in that the discontinuity is embodied by a segmental protuberance or indentation provided on the indexing wheel (13, 15).

10. The displacement pick-up of claim 9, characterized in that upon axial magnetization of the indexing wheels (13, 15), the Hall sensors (27, 28, 29, 33) are disposed axially spaced apart from the associated indexing wheel (13, 15) in a three-dimensionally fixed manner, preferably on a printed circuit board (31), and that the segmental protuberances on the indexing wheels (13, 15) are each embodied as an integral prism (30, 33), of preferably circular-segmental cross section, axially protruding from the respective indexing wheel (13, 15), and radially spaced apart from the pivot axis (16, 26) of that indexing wheel.

* * * * *